US006917925B2

(12) United States Patent
Berenji et al.

(10) Patent No.: US 6,917,925 B2
(45) Date of Patent: Jul. 12, 2005

(54) CONVERGENT ACTOR CRITIC-BASED FUZZY REINFORCEMENT LEARNING APPARATUS AND METHOD

(75) Inventors: Hamid R. Berenji, Sunnyvale, CA (US); David Vengrov, Sunnyvale, CA (US)

(73) Assignee: Intelligent Inference Systems Corporation, Moffett Field ( * ) Notice: Subject to any disclaimer, the term of this patent is extended or adjusted under 35 U.S.C. 154(b) by 276 days.

(21) Appl. No.: 10/027,817

(22) Filed: Dec. 21, 2001

(65) Prior Publication Data

US 2002/0198854 A1 Dec. 26, 2002

Related U.S. Application Data

(60) Provisional application No. 60/280,681, filed on Mar. 30, 2001.

(51) Int. Cl.[7] ................................................. G06E 1/00
(52) U.S. Cl. ................................ 706/10; 706/1; 706/2; 706/3; 706/4; 706/5; 706/6; 706/7; 706/8; 706/9
(58) Field of Search ................................ 706/12, 1–10, 706/16, 18, 25; 700/50, 52; 318/567

(56) References Cited

U.S. PATENT DOCUMENTS

| | | | | |
|---|---|---|---|---|
| 5,250,886 A | * | 10/1993 | Yasuhara et al. | 318/567 |
| 5,257,343 A | * | 10/1993 | Kyuma et al. | 706/18 |
| 5,608,843 A | * | 3/1997 | Baird, III | 706/25 |
| 6,529,887 B1 | * | 3/2003 | Doya et al. | 706/12 |
| 6,601,049 B1 | * | 7/2003 | Cooper | 706/15 |
| 6,633,858 B2 | * | 10/2003 | Yamakawa et al. | 706/16 |
| 2003/0179717 A1 | * | 9/2003 | Hobbs et al. | 370/254 |

OTHER PUBLICATIONS

R. S. Sutton et al, "Toward a Modern Theory of Adaptive Networks: Expectation and Prediction.", *Psychological Review*, vol. 88, pp. 135–170, 1981, no month.

A. G. Barto et al., "Neuronlike Adaptive Elements That Can Solve Difficult Learning Control Problems", *IEEE Transactions on Systems, Man, and Cybermetics*, vol. 13, pp. 834–846, Sep./Oct. 1983.

T. Takagi et al. "Fuzzy Identification of Systems and Its Application to Modeling and Control", *IEEE Transactions on Systems, Man, and Cybermatics*, vol. 15, No. 1, pp. 116–132, Jan./Feb. 1985.

(Continued)

*Primary Examiner*—Anthony Knight
*Assistant Examiner*—Ronald D Hartman, Jr.
(74) *Attorney, Agent, or Firm*—Sierra Patent Group, Ltd.

(57) ABSTRACT

A system is controlled by an actor-critic based fuzzy reinforcement learning algorithm that provides instructions to a processor of the system for applying actor-critic based fuzzy reinforcement learning. The system includes a database of fuzzy-logic rules for mapping input data to output commands for modifying a system state, and a reinforcement learning algorithm for updating the fuzzy-logic rules database based on effects on the system state of the output commands mapped from the input data. The reinforcement learning algorithm is configured to converge at least one parameter of the system state to at least approximately an optimum value following multiple mapping and updating iterations. The reinforcement learning algorithm may be based on an update equation including a derivative with respect to at least one parameter of a logarithm of a probability function for taking a selected action when a selected state is encountered.

9 Claims, 3 Drawing Sheets

Part 1 of the ACFRL algorithm

OTHER PUBLICATIONS

R. J. Williams et al., "Toward a Theory of Reinforcement–Learning Connectionist Systems", *Technical Report NU–CC–88–3*, Northeastern University, College of Computer Science, Jul. 1988.

M. Sugeno, "Structure Identification Of Fuzzy Model", *Fuzzy Sets and Systems.*, vol. 28, pp. 15–33,1998, no month.

C. J. H. Watkins, "Learning from Delayed Rewards.", Ph.D. Thesis, Cambridge University, May 1989.

H. R. Berenji, "A Reinforcement Learning–Based Architecture For Fuzzy Logic Control", *International Journal of Approximate Reasoning*, vol. 6, No. 2, 267–292, Feb. 1992.

H. R. Berenji et al., "Learning and Tuning Fuzzy Logic Controllers Through Reinforcements", *IEEE Transactions on Neural Networks*, vol. 3, No. 5, pp. 724–740, Sep. 1992.

B. Kosko, "Fuzzy Systems as Universal Approximators", *IEEE Intl. Conf. On Fuzzy Systems (FUZZ–IEEE '92)*, pp. 1153–1162, 1992, no month.

L.–X. Wang, "Fuzzy systems are universal approximators", *IEEE International Conference on Fuzzy Systems (FUZZ–IEEE '92)*, pp. 1163–1169, 1992, no month.

D. A. White et al., *Handbook of Intelligent Control: Neural, Fuzzy, and Adaptive Approaches*, Van Nostrand Reinhold, pp. 93–139, 1992.

H. Berenji et al., "Clustering in Product Space for Fuzzy Inference", *Second IEEE International Conference Fuzzy Systems*, vol. II, pp. 1402–1407, Mar./Apr. 1993.

H. Berenji, "Fuzzy Q–Learning: A New Approach for Fuzzy Dynamic Programming", *Third IEEE International Conference on Fuzzy Systems*, vol. 1, pp. 486–491, Jun. 1994.

"CDG: CDMA Technology: About CDMA Technology: Introduction to CDMA", [Internet] http://www.cdg.org/tech/a_ross/Intro.asp, 2 pages, printed Oct. 8, 2002.

CDG: CDMA Technology: About CDMA Technology: Multiple Access Wireless Communications, [Internet] http://www.cdg.org/tech/a_ross/MultipleAccess.asp, 3 pages, printed Oct. 8, 2002.

CDG: CDMA Technology: About CDMA Technology: The CDMA Revolution, [Internet] http://www.cdg.org/tech/a_ross/CDMARevolution.asp, 7 pages, printed Oct. 8, 2002.

CDG: CDMA Technology: About CDMA Technology: Common Air Interface, [Internet] http://www.cdg.org/tech/a_ross/CAI.asp, 1 page, printed Oct. 8, 2002.

CDG: CDMA Technology: About CDMA Technology: Forward CDMA Channel, [Internet] http://www.cdg.org/tech/a_ross/Forward.asp, 5 pages, printed Oct. 8, 2002.

CDG: CDMA Technology: About CDMA Technology: Reverse CDMA Channel, [Internet] http://www.cdg.org/tech/a_ross/Reverse.asp, 4 pages, printed Oct. 8, 2002.

T. Jaakola et al., "Reinforcement Learning Algorithms for Partially Observable Markov Decision Problems", *Advances in Neural Information Process Systems*, vol. 7, pp. 345–352, 1995, no month.

H. R. Berenji, "Fuzzy Q–Learning for Generalization of Reinforcement Learning", *Fifth IEEE International Conference on Fuzzy Systems*, vol. 3, pp. 2208–2214, Sep. 1996.

"Fuzzy Logic, Neural Networks, and Genetic Algorithms" Conference Advertisement, Intelligent Inference Systems Corp. Conference Date Oct. 1996.

D. P. Bertsekas et al., *Neuro–Dynamic Programming*, Athena Scientific, 1996, no month.

H. R. Berenji et al., "Refining the Shuttle Training Aircraft Controller", *Sixth IEEE International Conference On Fuzzy Systems*, vol. II, pp. 677–681, Jul. 1997.

R. S. Sutton et al, *Reinforcement Learning: An Introduction*, MIT Press, 1998, no month.

H. R. Berenji et al., "Cooperation and Coordination Between Fuzzy Reinforcement Learning Agents in Continuous State Partially Observable Markov Decision Process", *Proceedings of the $8^{th}$ IEEE International Conference on Fuzzy Systems (FUZZ–IEEE '99)*, pp. 621–627, Aug. 1999.

V. Konda et al., "Actor–Critic Algorithms", *Advances in Neural Information Processing Systems*, vol. 12, pp. 1008–1014, Nov. 1999.

L. C. Baird, "Gradient Descent for General Reinforcement Learning", *Advances in Neural Information Processing Systems 11*, 7 pages, 1999, no month.

S. V. Hanly et al., "Power Control and Capacity of Spread Spectrum Wireless Networks", *Automatica*, vol. 36, No. 12, pp. 1987–2012, 1999, no month.

N. Bambos,et al., "Power Controlled Multiple Accesc (PCMA) in Wireless Communication Networks", *Proceedings of IEEE Conference on Computer Communications (IEEE Infocom 2000)*, New York, Mar. 2000.

J. Baxter, "Reinforcement Learning in POMDP's via Direct Gradient Ascent", *Proceedings of the $17^{th}$ International Conference on Machine Learning*, pp. 41–48, Jun. 29–Jul. 2, 2000.

D. Vengerov, "Adavantages of Cooperation Between Rinforcement Learning Agents in Difficult Stochastic Problems", *Proceedings of the $9^{th}$ IEEE International Conference on Fuzzy Systems (FUZZ–IEEE 2000)*, pp. 871–876, 2000, no month.

R. S. Sutton, "Policy gradient methods for reinforcement learning with function approximation", *Advances in Neural Information processing systems 12*, pp. 1057–1063, 2000, no month.

* cited by examiner

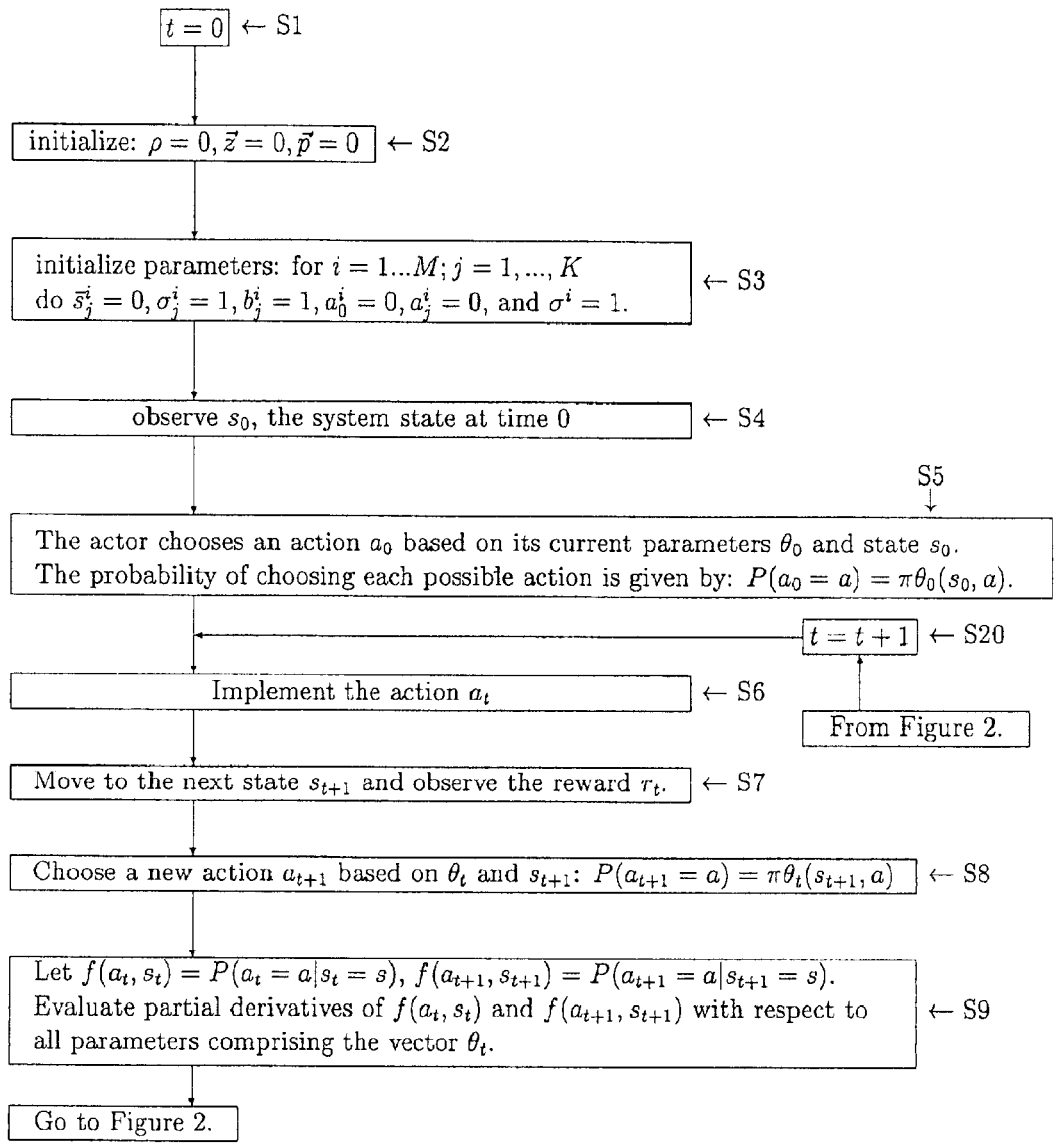
Figure 1: Part I of the ACFRL algorithm

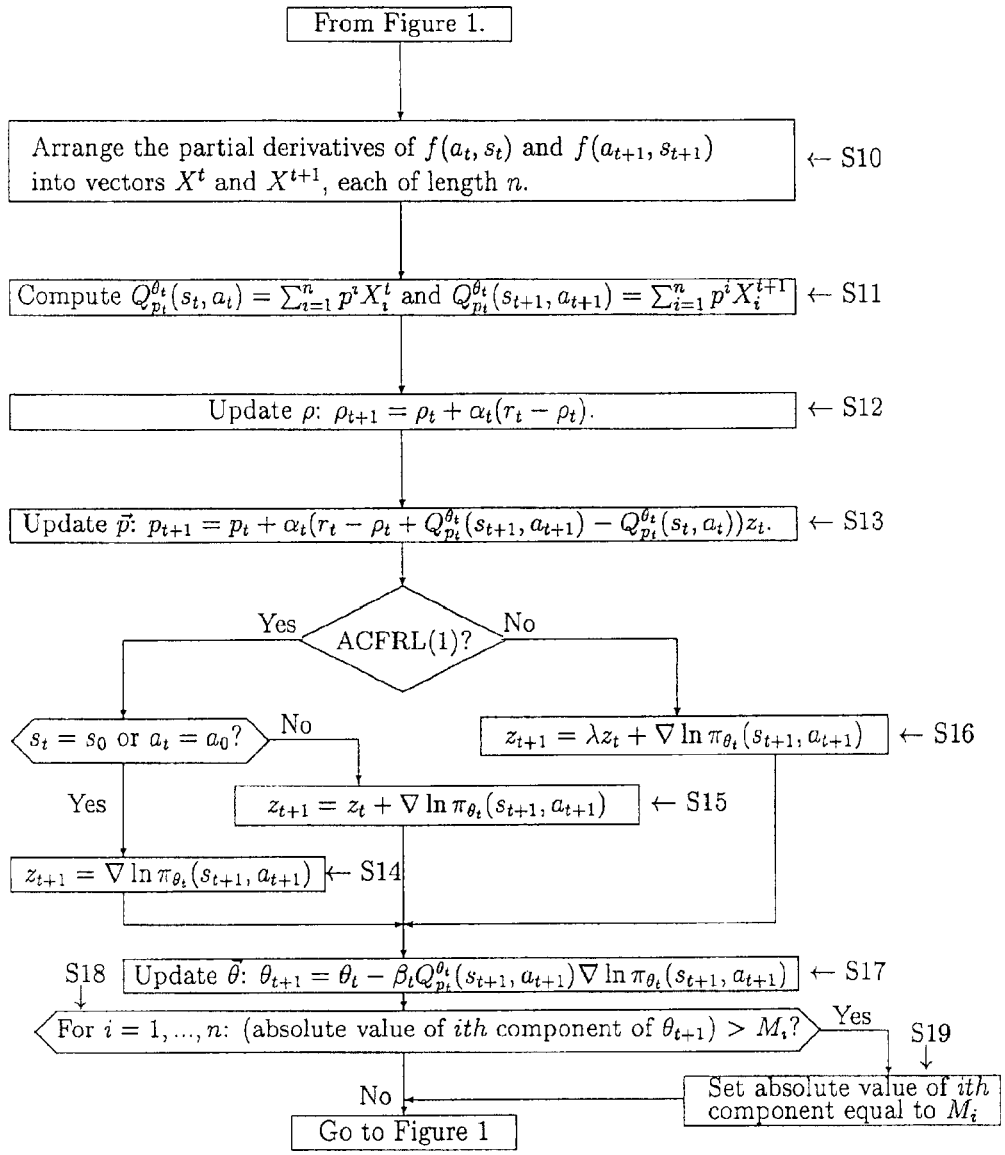
Figure 2: Part II of the ACFRL algorithm

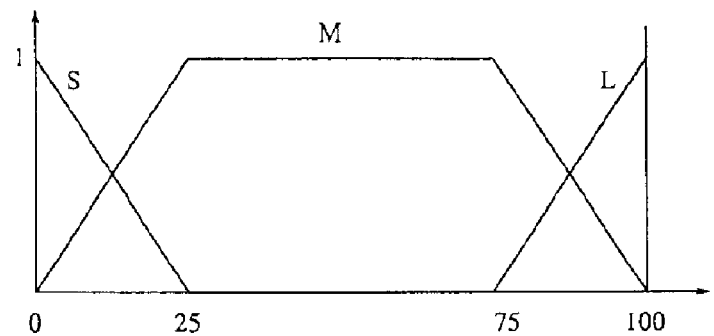
Figure 3: Interference fuzzy labels used by the transmitters.
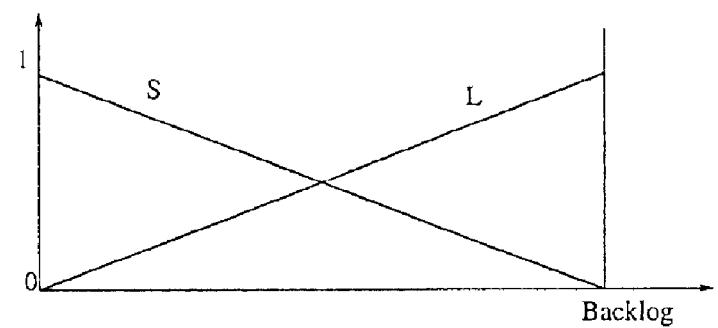
Figure 4: Backlog fuzzy labels used by the transmitters.

CONVERGENT ACTOR CRITIC-BASED FUZZY REINFORCEMENT LEARNING APPARATUS AND METHOD

PRIORITY

This application claims the benefit of priority to U.S. provisional patent application No. 60/280,681, filed Mar. 30, 2001.

BACKGROUND OF THE INVENTION

1. Field of the Invention

The present invention relates to actor-critic fuzzy reinforcement learning (ACFRL), and particularly to a system controlled by a convergent ACFRL methodology.

2. Discussion of the Related Art

Reinforcement learning techniques provide powerful methodologies for learning through interactions with the environment. Earlier, in ARIC (Berenji, 1992) and GARIC (Berenji and Khedkar, 1992), fuzzy set theory was used to generalize the experience obtained through reinforcement learning between similar states of the environment. In recent years, we have extended Fuzzy Reinforcement Learning (FRL) for use in a team of heterogeneous intelligent agents who collaborate with each other (Berenji and Vengerov, 1999, 2000). It is desired to have a fuzzy system that is tunable or capable of learning from experience, such that as it learns, its actions, which are based on the content of its tunable fuzzy rulebase, approach an optimal policy.

The use of policy gradient in reinforcement learning was first introduced by Williams (1992) in his actor-only REINFORCE algorithm. The algorithm finds an unbiased estimate of the gradient without assistance of a learned value function. As a result, REINFORCE learns much slower than RL methods relying on the value function, and has received relatively little attention. Recently, Baxter and Barlett (2000) extended the REINFORCE algorithm to partially observable Markov decision processes (POMDPs). However, learning a value function and using it to reduce the variance of the gradient estimate appears to be the key to successful practical applications of reinforcement learning.

The closest theoretical result to this invention is the one by Sutton et al. (2000). That work derives exactly the same expression for the policy gradient with function approximation as the one used by Konda and Tsitsiklis. However, the parameter updating algorithm proposed by Sutton et al. based on this expression is not practical: it requires estimation of the steady state probabilities under the policy corresponding to each iteration of the algorithm as well as finding a solution to a nonlinear programming problem for determining the new values of the actor's parameters. Another similar result is the VAPS family of methods by Baird and Moore (1999). However, VAPS methods optimize a measure combining the policy performance with accuracy of the value function approximation. As a result, VAPS methods converge to a locally optimal policy only when no weight is put on value function accuracy, in which case VAPS degenerates to actor-only methods.

Actor-critic Algorithms for Reinforcement Learning

Actor-critic (AC) methods were among the first reinforcement learning algorithms to use temporal-difference learning. These methods were first studied in the context of a classical conditioning model in animal learning by Sutton and Bartlo (1981). Later, Bartlo, Sutton and Anderson (1983) successfully applied AC methods to the cart-pole balancing problem, where they defined for the first time the terms actor and critic.

In the simplest case of finite state and action spaces, the following AC algorithm has been suggested by Sutton and Barto (1998). After choosing the action $a_t$ in the state $s_t$ and receiving the reward $r_t$, the critic evaluates the new state and computes the TD error:

$$\delta_t = r_t + \gamma V(s_{t+1}) - V(s_t), \quad (1)$$

where $\gamma$ is the discounting rate and V is the current value function implemented by the critic. After that, the critic updates its value function, which in the case of TD(0) becomes:

$$V(s_t) \leftarrow V(s_t) + \alpha_t \delta_t, \quad (2)$$

where $\alpha_t$ at is the critic's learning rate at time t. The key step in this algorithm is the update of actor's parameters. If TD error is positive, the probability of selecting $a_t$ in the state $s_t$ in the future should be increased since the gain in state value outweighs the possible loss of in the immediate reward. By reverse logic, the probability of selecting $a_t$ in the state $s_t$ in the future should be decreased if the TD error is negative. Suppose the actor chooses actions stochastically using the Gibbs softmax method:

$$Pr\{a_t = a | s_t = s\} = \frac{e^{\theta(s,a)}}{\Sigma_b e^{\theta(s,b)}}, \quad (3)$$

where $\theta(s,a)$ is the value of the actor's parameter indicating the tendency of choosing action a in state s. Then, these parameters are updated as follows:

$$\theta(s_t, a_t) \leftarrow \theta(s_t, a_t) + \beta_t \delta_t, \quad (4)$$

where $\beta_t$ is the actor's learning rate at time t.

The convergence properties of the above AC algorithm have not been studied thoroughly. The interest in AC algorithm subsided when Watkins (1989) introduced Q-learning algorithm and proved its convergence in finite state and action spaces. For almost a decade, Q-learning has served well the field of reinforcement learning (RL). However, as it is desired to apply RL algorithms to more complex problems, it is recognized herein that there are limitations to Q-learning in this regard.

First of all, as the size of the state space becomes large or infinite (as is the case for continuous state problems), function approximation architectures have to be employed to generalize Q-values across all states. The updating rule for the parameter vector $\theta$ of the approximation architecture then becomes:

$$\theta_t \leftarrow \theta_t + \alpha_t \nabla_{\theta_t} Q(s_t, a_t, \theta_t) \left( r_t + \gamma \max_a Q(s_{t+1}, a, \theta_t) - Q(s_t, a_t, \theta_t) \right). \quad (5)$$

Even though Q-learning with function approximation as presented in equation (5) is currently widely used in reinforcement learning, it has no convergence guarantees and can diverge even for linear approximation architectures (Bertsekas and Tsitsiklis, 1996). A more serious limitation of the general Q-learning equation presented above becomes apparent when the size of the action space becomes large or infinite. In this case, a nonlinear programming problem needs to be solved at every time step to evaluate $\max_a Q(s_{t+1}, a, \theta_t)$, which can seriously limit applications of this algorithm to real-time control problems.

The Q-learning algorithm, as well as most other RL algorithms, can be classified as a critic-only method. Such algorithms approximate the value function and usually choose actions in an $\epsilon$-greedy fashion with respect to the value function. At the opposite side of the spectrum of RL algorithms are actor-only methods (e.g. Williams, 1988; Jaakkola, Singh, and Jordan, 1995). In these methods, the gradient of the performance with respect to the actor's parameters is directly estimated by simulation, and the parameters are updated in the direction of the gradient improvement. The drawback of such methods is that gradient estimators may have a very large variance, leading to a slow convergence.

It is recognized herein that actor-critic algorithms combine the best features of critic-only and actor-only methods: presence of an actor allows direct computation of actions without having to solve a nonlinear programming problem, while presence of a critic allows fast estimation of performance gradient. The critic's contribution to the speed of gradient estimation is easily demonstrated by considering the reward used in computing the performance gradient in episode-based learning. In actor-only methods, $$\tilde{R}_t = r_t + \gamma r_{t+1} + \gamma^2 r_{t+2} + \ldots + \gamma^{T-t} r_T, \quad (6)$$

while using the critic's estimate of the value function, $$\hat{R}_t = r_t + \gamma V_t(s_{t+1}). \quad (7)$$

If $\{r_t: t>0\}$ are independent random variables with a fixed variance, then $\tilde{R}_t$ clearly has a larger variance than $\hat{R}_t$, which leads to a slow stochastic convergence. However, $\hat{R}_t$ initially has a larger bias because $V_t(s_{t+1})$ is an imperfect estimate of the true value function during the training phase.

Convergent Actor-critic Algorithm

Recently, Konda and Tsitsiklis (2000) presented a simulation-based AC algorithm and proved convergence of actor's parameters to a local optimum for a very large range of function approximation techniques. An actor in their algorithm can be any function that is parameterized by a linearly independent set of parameters, which is twice differentiable with respect to these parameters, and which selects every action with a non-zero probability. They also suggested that the algorithm will still converge for continuous state-action spaces if certain ergodicity assumptions are satisfied.

Konda and Tsitsiklis proposed two varieties of their algorithm, corresponding to TD($\lambda$) critic for $0 \leq \lambda < 1$ and TD(1) critic. In both variants, the critic is a linearly parameterized approximation architecture for the Q-function:

$$Q_p^\theta(s, a) = \sum_{i=1}^n p^i \frac{\partial}{\partial \theta_i} \ln \pi_\theta(s, a), \quad (8)$$

where $p=(p^1, \ldots, p^n)$ denotes the parameter vector of the critic, $\theta=(\theta^1, \ldots, \theta^n)$, denotes the parameter vector of the actor, and $\pi_\theta(s,a)$ denotes the probability of taking action a when the state s is encountered, under the policy corresponding to $\theta$. Notice that the critic has as many free parameters as the actor, and the basis functions of the critic are completely specified by the form of the actor. Therefore, only one independent function approximation architecture needs to be specified by the modeler.

In problems where no well-defined episodes exist, the critic also stores $\rho$, the estimate of the average reward under the current policy, which is updated according to:

$$\rho_{t+1} = \rho_t + \alpha_t (r_t - \rho_t). \quad (9)$$

The critic's parameter vector p is updated as follows:

$$p_{t+1} = p_t + \alpha_t (r_t - \rho_t + Q_{p_t}^{\theta_t}(s_{t+1}, a_{t+1}) - Q_{p_t}^{\theta_t}(s_t, a_t)) z_t, \quad (10)$$

where $\alpha_t$ is the critic's learning rate at time t and $z_t$ is an n-vector representing the eligibility trace. In problems with well-defined episodes, the average cost term $\rho$ is not necessary and can be removed from the above equations.

The TD(1) critic updates $z_t$ according to:

$$z_{t+1} = \begin{cases} z_t + \nabla \ln \pi_{\theta_t}(s_{t+1}, a_{t+1}), & s_t \neq s_0 \text{ or } a_t \neq a_0 \\ \nabla \ln \pi_{\theta_t}(s_{t+1}, a_{t+1}), & \text{otherwise.} \end{cases}$$

while the TD($\lambda$) critic updates $z_t$ according to:

$$z_{t+1} = \lambda z_t + \nabla \ln \pi_{\theta_t}(s_{t+1}, a_{t+1}). \quad (11)$$

It is recognized in the present invention that the update equation for actor's parameters may be simplified from that presented by Konda and Tsitsiklis (2000) by restricting $\theta$ to be bounded. In practice, this does not reduce the power of the algorithm since the optimal parameter values are finite in well-designed actors.

The resulting update equation is:

$$\theta_{t+1} = \Gamma(\theta_t - \beta_t Q_{p_t}^{\theta_t}(s_{t+1}, a_{t+1}) \nabla \ln \pi_{74\,t}(s_{t+1}, a_{t+1})), \quad (12)$$

where $\beta_t$ is the actor's learning rate at time t and $\Gamma$ stands for projection on a bounded rectangular set $\Theta \subset R^n$ (truncation).

The above algorithm converges if the learning rate sequences $\{\alpha_t\}, \{\beta_t\}$ are positive, nonincreasing, and satisfy $\beta_t/\alpha_t \to 0$ as well as $$\delta_t > 0 \text{ for } t > 0, \sum_t \delta_t = \infty, \sum_t \delta_t^2 < \infty,$$

where $\delta_t$ stands for either $\alpha_t$ or $\beta_t$.

It is desired to have an actor-critic algorithm for use in controlling a system with fuzzy reinforcement learning that converges to at least approximately a locally optimal policy.

SUMMARY OF THE INVENTION

In view of the above, a system is provided that is controlled by an actor-critic based fuzzy reinforcement learning algorithm that provides instructions to a processor of the system for applying actor-critic based fuzzy reinforcement learning. The system includes a database of fuzzy-logic rules for mapping input data to output commands for modifying a system state, and a reinforcement learning algorithm for updating the fuzzy-logic rules database based on effects on the system state of the output commands mapped from the input data. The reinforcement learning algorithm is configured to converge at least one parameter of the system state to at least approximately an optimum value following multiple mapping and updating iterations. A software program and method are also provided.

In a preferred embodiment, the reinforcement learning algorithm may be based on an update equation including a derivative with respect to said at least one parameter of a logarithm of a probability function for taking a selected action when a selected state is encountered. The reinforcement learning algorithm may be configured to update the at least one parameter based on said update equation. The system may include a wireless transmitter, a wireless network, an electro-mechanical system, a financial system such as for portfolio management, pricing of derivative securities, granting loans and/or determining credit worthiness, or insurance, medical systems such as for determining usefulness of new drug therapies, text and data mining such as for web engines or web caching, and/or biologically-inspired robotics.

BRIEF DESCRIPTION OF THE DRAWINGS

FIGS. 1 and 2 illustrate in operations in a preferred method for controlling a system with convergent actor-critic fuzzy reinforcement learning.

FIGS. 3 and 4 illustrate backlog and interference fuzzy labels used by agents in the 6 fuzzy rules presented in the "SOLUTION METHODOLOGY" section.

INCORPORATION BY REFERENCE

What follows is a cite list of references each of which is, in addition to those references cited above and below, and including that which is described as background and the summary of the invention, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the detailed description of the preferred embodiment with the same effect as just described with respect to the following references:

Baird, L. C., and Moore, A. W. (1999). "Gradient descent for general reinforcement learning". Advances in Neural Information Processing Systems 11.

Bambos, N., and Kandukuri, S., (2000) "Power controlled multiple access (PCMA) in wireless communication networks," In Proceedings of IEEE Conference on Computer Communications (IEEE Infocom 2000), New York, March 2000.

Barto, A. G., Sutton, R. S., and Anderson, C. W. (1983) "Neuronlike elements that can solve difficult learning control problems." *IEEE Transactions on Systems, Man, and Cybernetics*, 13:835–846.

Baxter, J. and Bartlett, P. L. (2000) "Reinforcement learning in POMDP's via direct gradient ascent." emphProceedings of the 17th International Conference on Machine Learning.

Berenji, H. R., (1992) "An architecture for designing fuzzy controllers using neural networks", *International Journal of Approximate Reasoning*, vol. 6, no. 2, pp. 267–292.

Berenji, H. R. and Khedkar, P. (1992) "Learning and tuning fuzzy logic controllers through reinforcements", *IEEE Transactions on Neural Networks*, volume 3, no. 5, 724–740.

Berenji, H. R. and Vengerov, D. (1999) "Cooperation and coordination between fuzzy reinforcement learning agents in continuous state partially observable markov decision processes," *Proceedings of the 8th IEEE International Conference on Fuzzy Systems* (FUZZ-IEEE '99), pp. 621–627.

Berenji, H. R. and Vengerov, D. (2000), "Advantages of cooperation between reinforcement learning agents in difficult stochastic problems," *Proceedings of the 9th IEEE International Conference on Fuzzy Systems* (FUZZ-IEEE 2000), pp. 871–876.

Hanly, S. V. and Tse, D. N. (1999) "Power control and capacity of spread spectrum wireless networks," *Automatica*, vol. 35, no. 12, pp. 1987–2012.

Bertsekas, D. P. and Tsitsiklis, J. N. (1996) *Neuro-Dynamic Programming*, Athena Scientific.

Jaakola, T., Singh, S. P., and Jordan, M. I. (1995) "Reinforcement learning algorithms for partially observable Markov decision problems." *Advances in Neural Information Processing Systems*, 7:345–352.

Konda, V. R. and Tsitsiklis, J. N. (2000) "Actor-critic algorithms," *Advances in Neural Information Processing Systems*, Vol. 12.

Kosko, B. (1992) "Fuzzy systems as universal approximators," IEEE International Conference on Fuzzy Systems (FUZZ-IEEE '92), pp. 1153–1162.

Sugeno, M., Kang, G. T. (1988) "Structure identification of fuzzy model," *Fuzzy Sets and Systems*, Vol. 28, pp. 15–33.

Sutton, R. S. and Barto, A. G. (1981) "Toward a modern theory of adaptive networks: Expectation and prediction." *Psychological Review*, 88:135–170.

Sutton, R. S. and Barto, A. G. (1998). *Reinforcement Learning: An Introduction*. MIT Press.

Sutton, R. S., McAllester, D., Singh, S., Mansour, Y. (2000). "Policy gradient methods for reinforcement learning with function approximation." *Advances in Neural Information Processing Systems* 12, pp. 1057–1063.

Takagi, T. and Sugeno, M. (1985) "Fuzzy identification of systems and its application to modeling and control," *IEEE Transactions on Systems, Man, and Cybernetics*, 15:1, pp. 116–132.

TIA/EIA/IS-95, "Mobile station—base station compatability standard for dualmode wideband spread spectrum cellular systems," Technical Report, Telecommunications Industry Association, July 1995.

Wang, L.-X. (1992) "Fuzzy systems are universal approximators," *IEEE International Conference on Fuzzy Systems* (FUZZ-IEEE '92), pp. 1163–1169.

Watkins, C. J. H. (1989) *Learning from delayed rewards*. Ph.D. thesis, Cambridge University.

Williams, R. J. (1988) "Toward a theory of reinforcement-learning connectionst systems." Technical Report NU-CCS-88-3, Northeastern University, College of Computer Science.

DETAILED DESCRIPTION OF THE PREFERRED EMBODIMENTS

What follows is a preferred embodiment of a system and method for convergent fuzzy reinforcement learning (FRL) as well as experimental results that illustrate advantageous features of the system. Below are provided a preferred fuzzy rulebase actor that satisfies conditions that guarantee the convergence of its parameters to a local optimum. The preferred fuzzy rule-base uses TSK rules, Gaussian membership functions and product inference. As an application domain, power control in wireless transmitters, characterized by delayed rewards and a high degree of stochasticity, are illustrated as am example of a system that may be enhanced with the convergent actor-critic FRL (ACFRL).

As mentioned above, many further applications may be enhanced through incorporation of the control system of the preferred embodiment such as wireless networks, electromechanical systems, financial systems such as for portfolio management, pricing of derivative securities, granting loans and/or determining credit worthiness, or insurance systems, medical systems such as for determining usefulness of new drug therapies, text and data mining systems such as for web engines or web caching, image processing systems and/or biologically-inspired robotic systems, wherein a convergent ACFRL according to the preferred embodiment and similar to the illustrative wireless transmission example is used to enhance control features of those systems. Advantageously, the ACFRL algorithm of the preferred embodiment consistently converges to a locally optimal policy. In this way, the fuzzy rulebase is tuned such that system actions converge to optimal.

Some advantages of the preferred embodiment include wide applicability to fuzzy systems that become adaptive and learn from the environment, use of reinforcement learning techniques which allow learning with delayed rewards, and convergence to optimality. The advantageous combination of these three features of the preferred embodiment when applied to control a system can be very powerful. For example, many systems that currently benefit from use of fuzzy control algorithms may be enhanced by including adaptive ACFRL control according to the preferred embodiment set forth herein. Rule-based and non rule-based fuzzy systems may each benefit by the preferred ACFRL system.

Fuzzy Rules for Action Selection

As used herein, a fuzzy rulebase is a function $f$ that maps an input vector s in $R^K$ into an output vector a in $R^m$. Multi-input-single-output (MISO) fuzzy systems $f:R^K \to R$ are preferred.

The preferred fuzzy rulebase includes of a collection of fuzzy rules although a very simple fuzzy rulebase may include only a single fuzzy rule. A fuzzy rule i is a function $f_i$ that maps an input vector s in $R^K$ into a scalar a in R. We will con sider fuzzy rules of the Takagi-Sugeno-Kang (TSK) form (Takagi and Sugeno, 1985; Sugeno and Kang, 1988):

Rule i: IF $s_1$ is $S_1^i$ and $s_2$ is $S_2^i$ and ... and $s_K$ is $S_K^i$ THEN a is $\bar{a}^i=$ $$a_0^i + \sum_{j=1}^{K} a_j^i s_j,$$

where $S_j^i$ are the input labels in rule i and $a_j^i$ are tunable coefficients. Each label is a membership function $\mu:R \to R$ that maps its input into a degree to which this input belongs to the fuzzy category (linguistic term) described by this label.

A preferred fuzzy rulebase function $f(s)$ with M rules can be written as:

$$a = f(s) = \frac{\sum_{i=1}^{M} \bar{a}^i w^i(s)}{\sum_{i=1}^{M} w^i(s)}, \quad (13)$$

where $\bar{a}^i$ is the output recommended by rule i and $w^i(s)$ is the weight of rule i. The preferred multi-output system may be decomposed into a collection of single-output systems.

Where input labels have Gaussian form in equation (13):

$$\mu_{S_j^i}(s_j) = b_j^i \exp\left(-\frac{(s_j - \bar{s}_j^i)^2}{2\sigma_j^{i2}}\right). \quad (14)$$

The product inference is used for computing the weight of each rule:

$$w^i(s) = \prod_{j=1}^{K} \mu_{S_j^i}(s_j).$$

Wang (1992) proved that a fuzzy rulebase with the above specifications can approximate any continuous function on a compact input set arbitrarily well if the following parameters are allowed to vary: $\bar{s}_j^i$, $\sigma_j^i$, $b_j^i$, and $\bar{a}^i$. His result obviously applies when $$\bar{a}^i = a_0^i + \sum_{j=1}^{K} a_j^i s_j,$$

in which case $a_j^i$ become the variable parameters. Making these substitutions into equations (13) we get:

$$a = f(s) = \frac{\sum_{i=1}^{M} \bar{a}^i \left(\prod_{j=1}^{K} b_j^i\right) \exp\left(-\sum_{j=1}^{K} \frac{(s_j - \bar{s}_j^i)^2}{2(\sigma_j^i)^2}\right)}{\sum_{i=1}^{M} \left(\prod_{j=1}^{K} b_j^i\right) \exp\left(-\sum_{j=1}^{K} \frac{(s_j - \bar{s}_j^i)^2}{2(\sigma_j^i)^2}\right)}. \quad (15)$$

In preferred reinforcement learning applications, knowing the probability of taking each available action allows for exploration of the action space. A Gaussian probability distribution with a mean $\bar{a}^i$ and a variance $\sigma^i$ is used instead of $\bar{a}^i$ in equation (15). That is, the probability of taking action a when the state s is encountered, under the policy corresponding to $\theta$ (the vector of all tunable parameters in the fuzzy rulebase) is given by:

$$\pi_\theta(s, a) = \frac{\sum_{i=1}^{M} \exp\left(-\frac{(\bar{a}^i - a)^2}{2(\sigma^i)^2}\right) \left(\prod_{j=1}^{K} b_j^i\right) \exp\left(-\sum_{j=1}^{K} \frac{(s_j - \bar{s}_j^i)^2}{2(\sigma_j^i)^2}\right)}{\sum_{i=1}^{M} \left(\prod_{j=1}^{K} b_j^i\right) \exp\left(-\sum_{j=1}^{K} \frac{(s_j - \bar{s}_j^i)^2}{2(\sigma_j^i)^2}\right)}. \quad (16)$$

What follows is a convergence proof for the preferred ACFRL for the case of a fuzzy rulebase actor specified in equation (16).

Convergence of FRL

Consider a Markov decision process with a finite state space S and a finite action space A. Let the actor be represented by a randomized stationary policy (RSP) $\pi$, which is a mapping that assigns to each state $s \in S$ a probability distribution over the action space A. Consider a set of RSPs $P = \{\pi_\theta; \theta \in R^n\}$, parameterized in terms of a vector $\theta$. For each pair $(s,a) \in S \times A$, $\pi_\theta(s,a)$ denotes the probability of taking action a when the state s is encountered, under the policy corresponding to $\theta$.

The following restricted assumptions about the family of policies P are sufficient for convergence of the algorithm defined by equations (8)–(12):

A1. For each $\theta \in R^n$, the Markov chains $\{S_m\}$ of states and $\{S_m, A_m\}$ of state-action pairs are irreducible and aperiodic, with stationary distributions $\pi_\theta(s)$ and $\eta_\theta(s, a) = \pi_\theta(s)\pi_\theta(s,a)$, respectively, under the RSP $\pi_\theta$.

A2. $\pi_\theta(s,a)>0$, and for all $\theta \in R^n$, $s \in S$, $a \in A$.

A3. For all $s \in S$ and $a \in A$, the map $\theta \to \pi_{74}(s,a)$ is twice differentiable.

A4. Consider the function $\psi_\theta(s,a)=\nabla \ln \pi_\theta(s,a)=\nabla\pi_\theta(s,a)/\pi_{74}(s,a)$, which is well-defined and differentiable by A2 and A3. Then, for each $\theta \in R^n$, the n×n matrix $G(\theta)$ defined by $$G(\theta) = \sum_{s,a} \eta_\theta(s,a)\psi_\theta(s,a)\psi_\theta(s,a)^T \quad (17)$$

needs to be uniformly positive definite. That is, there exists some $\epsilon_1>0$ such that for all $r \in R^n$ and $\theta \in R^n$, $$r^T G(\theta) r \geq \epsilon_1 \|r\|^2. \quad (18)$$

The first assumption concerns the problem being solved, while the last three assumptions concern the actor's architecture. In practice, the first assumption usually holds because either all states communicate under Assumption 2 or the learning is episodic and the system gets re-initialized at the end of every episode.

Assumption A2 obviously holds for the fuzzy rulebase under consideration because the output is a mixture of Gaussian functions.

We will verify the Assumption A3 directly, by differentiating the output of the actor with respect to all parameters. Obtaining explicit expressions for the derivatives of $\pi_\theta(s,a)$ will also help us in verifying Assumption A4. Let $$F^i = \exp\left(-\frac{(\bar{a}^i - a)^2}{2(\sigma^i)^2}\right),$$

$$G^i = \exp\left(-\sum_{j=1}^{K} \frac{(s_j - \bar{s}^i_j)^2}{2(\sigma^i_j)^2}\right),$$

$$H^i = \frac{\left(\prod_{j=1}^{K} b^i_j\right) F^i G^i}{\sum_{m=1}^{M} G^i \left(\prod_{j=1}^{K} b^i_j\right)}.$$

Then, differentiating (16) with respect to $a_j^i$ we get for j=0:

$$\frac{\partial}{\partial(a^i_0)}\pi_\theta(s,a) = H^i a - \frac{a^i_0}{(\sigma^i)^2}, \quad (19)$$

and for j=1, . . . , K:

$$\frac{\partial}{\partial(a^i_j)}\pi_\theta(s,a) = H^i \frac{a - a^i_j}{(\sigma^i)^2} s_j, \quad (20)$$

which in both cases is a product of a polynomial and exponential in $a_j^i$ and hence is differentiable once again.

Differentiating (16) with respect to the variance of the output action distribution $\sigma^i$ we get:

$$\frac{\partial}{\partial(\sigma^i)}\pi_\theta(s,a) = \frac{H^i(\bar{a}^i - a)^2}{(\sigma^i)^3}, \quad (21)$$

which is a fraction of polynomials and exponentials of polynomials in $\sigma^i$ and hence is differentiable once again.

Differentiating (16) with respect to $b_j^i$ we get:

$$\frac{\partial}{\partial(b^i_j)}\pi_\theta(s,a) = \frac{H^i}{b^i_j}\left(1 - \frac{\pi_\theta(s,a)}{F^i}\right), \quad (22)$$

which is a fraction of two polynomials in $b_j^i$ and hence is differentiable once again.

Differentiating (16) with respect to the input label parameter $\sigma_j^i$ we get:

$$\frac{\partial}{\partial(\sigma^i_j)}\pi_\theta(s,a) = H^i\left(1 - \frac{\pi_\theta(s,a)}{F^i G^i} \frac{(s_j - \bar{s}^i_j)^2}{(\sigma^i_j)^3}\right), \quad (23)$$

which has only polynomial and exponential terms in $\sigma_j^i$ and hence is differentiable once again.

Differentiating (16) with respect to the input label parameter $\bar{s}_j^i$ we get:

$$\frac{\partial}{\partial(\bar{s}^i_j)}\pi_\theta(s,a) = H^i\left(1 - \frac{\pi_\theta(s,a)}{F^i G^i} \frac{(\bar{s}^i_j - s_j)}{(\sigma^i_j)^2}\right), \quad (24)$$

which has only polynomial and exponential terms in $\bar{s}_j^i$ and hence is differentiable once again. Equations (19)–(24) show that both first and second derivatives exist of $\pi_\theta(s,a)$, and hence the assumption A3 is verified.

In order to verify assumption A4, note that the functions $\psi_{\theta_i}$, i=1, . . . , n, as defined in Assumption A4, can be computed by dividing the derivatives in equations (19)–(24) by $\pi_\theta(s,a)$. Let us rewrite the functions $\psi_{\theta_i}$, i=1, . . . , n, as vectors by evaluating them sequentially at all the state-actions pairs (s,a). These vectors are linearly independent because after dividing by $\pi_\theta(s,a)$, the derivatives in equations (19)–(24) are nonlinear in their arguments and no function is a constant multiple of another.

Rewriting the function $G(\theta)$ in the matrix form we get:

$$G(\theta)=M^T W M,$$

where M is a ($|S|\times|A|$)-by-n matrix with $\psi_{\theta_i}$ as columns and W is a diagonal matrix with $\eta_\theta$ on the main diagonal evaluated sequentially at all state-action pairs. Since $\eta_\theta(s,a)>0$ for every (s,a), we have for every vector $r \neq 0$, $$r^T G(\theta) r = r^T M^T W M r = (Mr)^T W(Mr) > 0 \quad (25)$$

because linear independence of columns of M implies $Mr \neq 0$. Since $$f(r,\theta) \equiv \frac{r^T G(\theta) r}{\|r\|^2} = f(kr, \theta)$$

for any k>0, it follows from (25) that $$\inf_{r \neq 0} \frac{r^T G(\theta) r}{\|r\|^2} = \inf_{\|r\|=1} \frac{r^T G(\theta) r}{\|r\|^2} = \epsilon_1(\theta) > 0, \quad (26)$$

because $r^T G(\theta) r$ is continuous in r and thus achieves its minimum on the compact set $S=\{r:\|r\|=1\}$. Since inequality (18) is obviously satisfied for any $\epsilon$ at r=0, in the light of (26) it holds for all r. That is, for any given $\theta \in R^n$, there exists some $\epsilon_1(\theta)>0$ such that $$r^T G(\theta) r \geq \epsilon_1(\theta) \|r\|^2 \text{ for all } r \in R^n. \quad (27)$$

It remains to show that (27) holds uniformly for all $\theta$. Since the space T of all $\theta$ admitted by our FRL algorithm is bounded because of the truncation operator in equation (12), there exists $\theta^*$ in $\overline{T}$, the closure of T,s.t.$\epsilon_1(\theta^*)>0$ is minimal by continuity of $\epsilon_1(\theta)$. Hence, there exists $\epsilon_1=\epsilon_1(\theta^*)>0$ such that $$\frac{r^T G(\theta) r}{\|r\|^2} \geq \epsilon_1$$

for all $\theta \in \overline{T}$ and for all r. Thus, the matrix $G(\theta)$ is uniformly positive definite over the space of possible $\theta$ admitted by our actor-critic algorithm.

We have just verified that the fuzzy actor satisfies all the assumptions necessary for convergence. Therefore, the learning process in the actor-critic based FRL algorithm acoording to the preferred embodiment converges to an optimal value of the parameter vector $\theta$.

Illustrative Method

FIGS. 1 and 2 schematically show, in flow diagram format, an illustrative method according to a preferred embodiment. Referring to FIG. 1, parameter t is set to t=0 at step S1. Then the critic's parameter $\rho$ and vectors $\vec{z}$ and $\vec{p}$ are set to 0 at step S2. At step S3, actor's parameters are initialized: $\bar{s}_j^i=0, \sigma_j^i=1, b_j^i=1, a_0^i=0, a_j^i=0, \sigma^i=1$ for $i=1 \ldots M$ and $j=1 \ldots K$. These parameters are also arranged into a single vector quantity $\theta$ at step S3. The system state at t=0 is denoted as $s_0$ at step S4. At step S5, the actor chooses an action $a_0$ based on its current parameters $\theta_0$ and the state $s_0$. The probability of choosing each possible action is given as $P(a_0=a)=\pi_{\theta_0}(s_0,a)$.

The method then goes to step S6, where the action $a_t$ is implemented. At step S7, the system moves to the next state $s_{t+1}$ and the reward $r_t$ is observed. Next, a new action $a_{t+1}$ based on $\theta_t$ and $s_{t+1}$ is chosen, wherein $P(a_{t+1}=a)=\pi\theta_t(s_{t+1},a)$ at step S8.

In step s9, the actor's output $P(a_t=a|s_t=s)$ is denoted by $f(a_t,s_t)$ and $P(a_{t+1}=a|s_{t+1}=s)$ is denoted by $f(a_{t+1},s_{t+1})$. Then partial derivatives of $f(a_t,s_t)$ and $f(a_{t+1},s_{t+1})$ are computed with respect to all parameters comprising the vector $\theta_t$ according to formulas (19)–(24).

Then at step S10 of FIG. 2, the partial derivatives of $f(a_t,s_t)$ and $f(a_{t+1},s_{t+1})$ are arranged into vectors $X^t$ and $X^{t+1}$, each being of length n.

At step S11, $$Q_{pt}^{\theta_t}(s_t, a_t) = \sum_{i=1}^{n} p^i X_i^t \text{ and} \tag{28}$$

$$Q_{pt}^{\theta_t}(s_{t+1}, a_{t+1}) = \sum_{i=1}^{n} p^i X_i^{t+1} \tag{29}$$

are computed.

At step S12, the parameter $\rho$ is updated according to equation (9) as $\rho_{t+1}=\rho_t+\alpha_t(r_t-\rho_t)$. At step S13, the vector $\vec{p}$ is updated according to equation (10) as $p_{t+1}=p_t+\alpha_t(r_t-\rho_t+Q_{p_t}^{\theta_t}(s_{t+1},a_{t+1})-Q_{p_t}^{\theta_t}(s_t,a_t))z_t$.

In steps s14 through s16, the vector z is updated accroding to equation (11). That is, the TD(1) critic updates $z_t$ according to:

$$z_{t+1} = \begin{cases} z_t + \nabla \ln \pi_{\theta_t}(s_{t+1}, a_{t+1}), & s_t \neq s_0 \text{ or } a_t \neq a_0 \\ \nabla \ln \pi_{\theta_t}(s_{t+1}, a_{t+1}), & \text{otherwise} \end{cases}$$

while the TD($\lambda$) critic updates $z_t$ according to:

$$z_{t+1} = \lambda z_t + \nabla \ln \pi_{\theta_t}(s_{t+1}, a_{t+1}). \tag{30}$$

At step S17, vector $\theta$ is updated according to equation (12) as:

$$\theta_{t+1} = \theta_t - \beta_t Q_{p_t}^{\theta_t}(s_{t+1}, a_{t+1}) \nabla \ln \pi_{\theta_t}(s_{t+1}, a_{t+1}). \tag{31}$$

In steps s18 and s19, if the absolute value any component of the vector $\theta_{t+1}$ is determined to be greater than some large constant $M_i$, it is truncated to be equal to $M_i$.

Then the method proceeds to step S20 of FIG. 1, wherein t is set to t+1.

Wireless Communication

What follows is a description of an application of the preferred ACFRL method to a practical wireless communication problem. As mentioned above, similar application can be described with respect to many other types of systems.

Domain Description

With the introduction of the IS-95 Code-Division Multiple Access (CDMA) standard (TIA/EIA/IS-95), the use of spread-spectrum as a multiple access technique in commercial wireless systems is growing rapidly in popularity. Unlike more traditional methods such as time-division multiple access (TDMA) or frequency-division multiple access (FDMA), the entire transmission bandwidth is shared between all users at all times. This allows to include more users in a channel at the expense of a gradual deterioration in their quality of service due to mutual interference.

In order to improve the efficiency of sharing the common bandwidth resource in this system, special power control algorithms are required. Controlling the transmitter powers in wireless communication networks provides multiple benefits. It allows interfering links sharing the same radio channel to achieve required quality of service (QoS) levels, while minimizing the power spent in the process and extending the battery life of mobile users. Moreover, judicious use of power reduces interference and increases the network capacity.

Most of the research in this area, however, concentrated on voice-oriented "continuous traffic," which is dominant in the current generation of wireless networks. Next generation wireless networks are currently being designed to support intermittent packetized data traffic, beyond the standard voice-oriented continuous traffic. For example, web browsing on a mobile laptop computer will require such services. The problem of power control in this new environment is not well understood, since it differs significantly from the one in the voice traffic environment.

Data traffic is less sensitive to delays than the voice traffic, but it is more sensitive to transmission errors. Reliability can be assured via retransmissions, which cannot be used in continuous voice traffic domains. Therefore, delay tolerance of data traffic can be exploited for design of efficient transmission algorithms that adapt the power level to the current interference level in the channel and to transmitter-dependent factors such as the backlog level.

Problem Formulation

The power control setup of Bambos and Kandukuri (2000) is preferred for testing the performance of the ACFRL algorithm. The transmitter is modeled as a finite-buffer queue, to which data packets arrive in a Poisson manner. When a packet arrives to a full buffer, it gets dropped and a cost L is incurred. The interference is uniformly distributed. At every time step k the agent observes current interference i(k) and backlog b(k) and chooses a power level p(k). The cost C(k) incurred by a wireless transmitter (agent) is a weighted sum of the backlog b(k) and the power p(k) used for transmission:

$$C(k) = \alpha p(k) + b(k). \quad (32)$$

The probability s of successful transmission for a power level p and interference i is:

$$s(p, i) = 1 - \exp\left(-\frac{p}{\delta i}\right), \quad (33)$$

where δ>0, with higher values indicating higher level of transmission noise. If transmission is not successful, the packet remains at the head of the queue. The agent's objective is to minimize the average cost per step over the length of the simulation.

In this problem, the agent faces the following dilemma when deciding on its power level: higher power implies a greater immediate cost but a smaller future cost due to reduction in the backlog. The optimal strategy here depends on several variables, such as buffer size, overflow cost, arrival rate, and dynamics of the interference.

Solution Methodology

Analytical investigations of this problem formulation have been performed by Bambos and Kandurkuri (2000). They have derived an optimal policy for single wireless transmitter when interference is random and either follows a uniform distribution or has a Markovian structure. Their strategy assumes that interference and backlog are used as input variables. When the agent observes a high interference in the channel, it recognizes that it will have to spend a lot of power to overcome the interference and transmit a packet successfully. Therefore, the agent backs off, buffers the incoming data packets and waits for the interference to subside. The exact level of interference at which agent goes into the backoff mode depends on the agents backlog. When the backlog is high and the buffer is likely to overflow, it is recognized herein that the agent should be more aggressive than when the backlog is low.

Distribution of interference is not known a priori, and the analytical solution of Bambos and Kandukuri cannot be applied. Instead, a simulation-based algorithm has to be used for improving the agents behavior. Another significant advantage of simulation-based algorithms is that they can be applied to much more complex formulations than the one considered above, such as the case of a simultaneous learning by multiple transmitters.

Unfortunately, conventional reinforcement learning algorithms cannot be applied to this problem because interference is a real-valued input and power is a real-valued output. State space generalization is required for dealing with real-valued inputs. An ACFRL algorithm according to a preferred embodiment may, however, be used to tackle this problem.

As discussed previously, Bambos and Kandukuri (2000) have shown that the optimal power function is hump-shaped with respect to interference, with the height as well as the center of the hump steadily increasing with backlog. Therefore, the following rules used in the ACFRL actor have a sufficient expressive power to match the complexity of the optimal policy:

If (backlog is SMALL) and (interference is SMALL) then (power is p1)

If (backlog is SMALL) and (interference is MEDIUM) then (power is p2)

If (backlog is SMALL) and (interference is LARGE) then (power is p3)

If (backlog is LARGE) and (interference is SMALL) then (power is p4)

If (backlog is LARGE) and (interference is MEDIUM) then (power is p5)

If (backlog is LARGE) and (interference is LARGE) then (power is p6), where p1 through p6 are the tunable parameters. The shapes of the backlog and interference labels are shown in FIGS. 3 and 4. The final power is drawn from a Gaussian distribution, which has as its center the conclusion of the above rulebase and has a fixed variance σ.

We chose to tune only a subset of all parameters in the above rulebase because our goal in these experiments was to demostrate the convergence property of ACFRL rather than the expressive capability of fuzzy logic for power control. The six chosen parameters have the greatest effect on the rulebase output and are the most difficult ones to estimate from prior knowledge.

Since we were not tuning the input label parameters, the membership functions may or may not be Gaussian, which were used in our proof for their differentiability property. Instead, we used triangular and trapezoidal labels for simplicity of implementation. FIGS. 3 and 4 illustrate how backlog and interference fuzzy labels, respectively, are used by the agents.

A difficulty in the considered power control problem is that a long wait occurs for determining the benefit of using a higher or a lower power. Because both arrivals and transmission are stochastic, many traces are used in order to distinguish the true value of a policy from random effects.

In order to apply an ACFRL algorithm according to a preferred embodiment to this challenging problem, we made actors exploration more systematic and separated the updates to the average cost per step, critics parameters and actors parameters into distinct phases. During the first phase, the algorithm runs 20 simulation traces of 500 steps each, keeping both the actor and the critic fixed, to estimate the average cost per step of the actors policy. Each trace starts with the same initial backlog. In the second phase only critic is learning based on the average cost p obtained in the previous phase. This phase includes of 20 traces during which the actor always uses the power that is one unit higher than the recommendation of its rulebase and 20 traces during which the actors power is one unit lower. As opposed to probabilistic exploration at every time step suggested by Konda and Tsitsiklis, the systematic exploration is very beneficial in problems with delayed rewards, as it allows the critic to observe more clearly the connection between a certain direction of exploration and the outcome. Finally, in the third phase, the algorithm runs 20 traces during which the critic is fixed and

| PERIOD | POLICY | AVE COST | STDEV |
|---|---|---|---|
| 0 | (1, 1, 1, 20, 20, 20) | 31.6 | 0.06 |
| 10 | (4.5 16.9 4.5 23.1 33.9 23.0) | 26.3 | 0.08 |
| 10 | (4.0 14.4 3.8 22.9 33.1 22.8) | 26.4 | 0.08 |
| 100 | (4.3 16.1 4.4 23.3 35.3 23.4) | 26.1 | 0.08 |
| 100 | (4.6 16.7 4.4 23.6 36.1 23.5) | 26.0 | 0.08 |

Table 1: Actor's performance during two independent training processes for uniform interference on [0,100]. the actor is learning.

Results

We have simulated the wireless power control problem with the following parameters:
Arrival Rate=0.4
Initial Backlog=10
Buffer Size=20
Overflow Cost L=50
Power Cost Factor α=1
Transmission Noise δ=1

We found that the ACFRL algorithm consistently converged to the same neighborhood for all six power parameters $p_i$ for a given initial condition. Each period in the experiments below consisted of all three phases.

Table 1 shows the results of two independent runs of the ACFRL algorithm for uniform interference. Both runs started with the same initial policy

| PERIOD | POLICY | AVE COST | STDEV |
|---|---|---|---|
| 0 | (1, 1, 1, 20, 20, 20) | 38.9 | 0.06 |
| 10 | (2.7 17.7 2.8 21.7 37.2 21.9) | 30.4 | 0.09 |
| 10 | (2.7 17.5 2.8 21.6 35.7 21.7) | 30.5 | 0.09 |
| 100 | (2.6 17.3 2.7 22.0 40.2 22.2) | 30.2 | 0.09 |
| 100 | (2.8 18.0 2.8 22.0 39.5 22.1) | 30.1 | 0.08 |

Table 2: Actor's performance during two independent training processes for Gaussian interference with mean 50 and standard deviation 20, clipped at 0.

$(p_1, p_2, p_3, p_4, p_5, p_6)$=(1, 1, 1, 20, 20, 20). Table 2 shows results of the same setup for Gaussian interference. The average cost of each policy is obtained by separately running it for 100 periods with 2000 traces total. Notice that the average cost of the policies obtained after 100 periods is significantly lower than the cost of the initial policy. Also, these results show that the ACFRL algorithm converges very quickly (on the order of 10 periods) to a locally optimal policy, and keeps the parameters there if the learning continues.

Notice that for the uniform interference, the shape of the resulting policy is the same as the one suggested by Bambos and Kandukuri (2000). That is, for a given level of backlog, the optimal power first increases with interference and then decreases. Also, as the backlog increases, the optimal power steadily increases for a given level of interference. The optimal policy for the case of uniform interference cannot be found analytically, because the Normal distribution is not invertible and Bambos and Kandukuri relied on inverting the distribution function in their calculations. However, the ACFRL algorithm handles this case just as well, and the resulting optimal policy once again has the expected form.

Above, an analytical foundation for the earlier work in Fuzzy Reinforcement Learning (FRL) conducted by ourselves and other researchers has been provided. Using an actor-critic approach to the reinforcement learning of Konda and Tsitsiklis (2000), a convergence proof for FRL has been postulated and then derived, where the actor is a fuzzy rulebase with TSK rules, Gaussian membership functions and product inference.

The performance of the ACFRL algorithm has been tested on a challenging problem of power control in wireless transmitters. The original actor-critic framework of Konda and Tsitsiklis (2000) is not adequate for dealing with the high degree of stochasticity and delayed rewards present in the power control domain. However, after separating the updates to the average cost per step, critics parameters, and actors parameters into distinct phases, the ACFRL algorithm of the preferred embodiment has shown consistent convergence results to a locally optimal policy.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the operations have been ordered in selected typographical sequences. However, the sequences have been selected and so ordered for typographical convenience and are not intended to imply any particular order for performing the operations, except for those claims wherein a particular ordering of steps is expressly set forth or understood by one of ordinary skill in the art as being necessary.

What is claimed is:

1. A method of controlling a system including a processor for applying actor-critic based fuzzy reinforcement learning to perform power control in a wireless transmitter, comprising the acts of:

mapping input data to output commands for modifying a system state according to fuzzy-logic rules;

using continuous, reinforcement learning, updating the fuzzy-logic rules based on effects on the system state of the output commands mapped from the input data; and converging at least one parameter of the system state towards at least approximately an optimum value following multiple mapping and updating iterations.

2. The method of claim 1, wherein updating includes taking a derivative with respect to said at least one parameter of a logarithm of a probability function for taking a selected action when a selected state is encountered.

3. The method of claim 2, wherein updating includes updating the at least one parameter based on said derivative.

4. A computer-readable medium containing instructions which, when executed by a computer, control a system for applying actor-critic based fuzzy reinforcement learning, by:

maintaining a database of fuzzy-logic rules for mapping input data to output commands for modifying a system state by using continuous, reinforcement learning to update the fuzzy-logic rules database based on effects on the system state of the output commands to control a wireless transmitter, the output commands mapped from the input data; and converging at least one parameter of the system state towards at least approximately an optimum value following multiple mapping and updating iterations.

5. The computer-readable medium of claim 4, wherein updating the fuzzy-logic database comprises taking a derivative with respect to said at least one parameter of a logarithm of a probability function for taking a selected action when a selected state is encountered.

6. The computer-readable medium of claim 5, wherein the at least one parameter is updated by taking the derivative with respect to said at least one parameter of a logarithm of a probability function for taking a selected action when a selected state is encountered.

7. A system controlled by actor-critic based fuzzy reinforcement learning, comprising:

a processor;

at least one system component whose actions are controlled by the processor; and instructions, which, when executed by the processor;

maintain a database of fuzzy-logic rules for mapping input data to output commands for modifying a system state by using continuous, reinforcement learning to update the fuzzy-logic rules database based on effects on the system state of the output commands mapped from the input data, wherein updating the fuzzy-logic database comprises taking a derivative with respect to said at least one parameter of a logarithm of a probability function for taking a selected action when a selected state is encountered; and converge at least one parameter of the system state towards at least approximately an optimum value following multiple mapping and updating iterations wherein updating the fuzzy-logic database comprises taking a derivative with respect to said at least one parameter of a logarithm of a probability function for taking a selected action when a selected state is encountered.

8. The system of claim 7, wherein the at least one parameter is updated by taking the derivative with respect to said at least one parameter of a logarithm of a probability function for taking a selected action when a selected is encountered.

9. The system of any of claims 7–8, wherein the system state comprises system state of a wireless transmitter.

* * * * *